(12) United States Patent
Zhu

(10) Patent No.: US 12,153,308 B2
(45) Date of Patent: Nov. 26, 2024

(54) DISPLAY PANEL

(71) Applicant: WUHAN CHINA STAR OPTOELECTRONICS TECHNOLOGY CO., LTD., Wuhan (CN)

(72) Inventor: Jiuhui Zhu, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/925,697

(22) PCT Filed: Nov. 10, 2022

(86) PCT No.: PCT/CN2022/131191
§ 371 (c)(1),
(2) Date: Nov. 16, 2022

(87) PCT Pub. No.: WO2024/045342
PCT Pub. Date: Mar. 7, 2024

(65) Prior Publication Data
US 2024/0219772 A1 Jul. 4, 2024

(30) Foreign Application Priority Data
Aug. 30, 2022 (CN) .......................... 202211049300.X

(51) Int. Cl.
*G02F 1/13357* (2006.01)
*G02F 1/1335* (2006.01)

(52) U.S. Cl.
CPC .. *G02F 1/133605* (2013.01); *G02F 1/133514* (2013.01); *G02F 1/133606* (2013.01)

(58) Field of Classification Search
CPC ......... G02F 1/133605; G02F 1/133514; G02F 1/133606
(Continued)

(56) References Cited

U.S. PATENT DOCUMENTS

2008/0100778 A1* 5/2008 Meng ................ G02F 1/133526
349/95
2015/0331281 A1 11/2015 Liu et al.
(Continued)

FOREIGN PATENT DOCUMENTS

CN 101169540 A 4/2008
CN 101452142 A 6/2009
(Continued)

OTHER PUBLICATIONS

PCT Search Report for International application No. PCT/CN2022/131191, mailed on May 17, 2023.
(Continued)

*Primary Examiner* — Charles S Chang
(74) *Attorney, Agent, or Firm* — The Roy Gross Law Firm, LLC; Roy Gross

(57) ABSTRACT

A display panel is provided by the present application. The display panel includes a plurality of sub-pixel opening regions, the display panel includes a light concentrating layer, including a plurality of light concentrating structures and a plurality of light isolating structures; the plurality of the light concentrating structures are disposed in the plurality of the sub-pixel opening regions in a one-to-one correspondence, and any adjacent two of the light concentrating structures are provided with one of the light isolating disposed therebetween.

20 Claims, 5 Drawing Sheets

(58) Field of Classification Search
USPC .......................................................... 349/95
See application file for complete search history.

(56) References Cited

U.S. PATENT DOCUMENTS

| | | | | |
|---|---|---|---|---|
| 2022/0158133 A1* | 5/2022 | Li | ..................... | G02F 1/133526 |
| 2023/0209886 A1* | 6/2023 | Lee | ..................... | H10K 50/858 |
| | | | | 257/40 |

FOREIGN PATENT DOCUMENTS

| | | | |
|---|---|---|---|
| CN | 103175034 | A | 6/2013 |
| CN | 104678641 | A | 6/2015 |
| CN | 110854298 | A | 2/2020 |
| CN | 111366997 | A | 7/2020 |
| CN | 113219691 | A | 8/2021 |
| CN | 113782572 | A | 12/2021 |
| CN | 216979513 | U | 7/2022 |
| JP | 2003227903 | A | 8/2003 |
| TW | 200925725 | A | 6/2009 |

OTHER PUBLICATIONS

PCT Written Opinion of the International Search Authority for International application No. PCT/CN2022/131191, mailed on May 17, 2023.
Chinese Office Action issued in corresponding Chinese Patent Application No. 202211049300.X dated Oct. 11, 2023, pp. 1-6, 12pp.

* cited by examiner

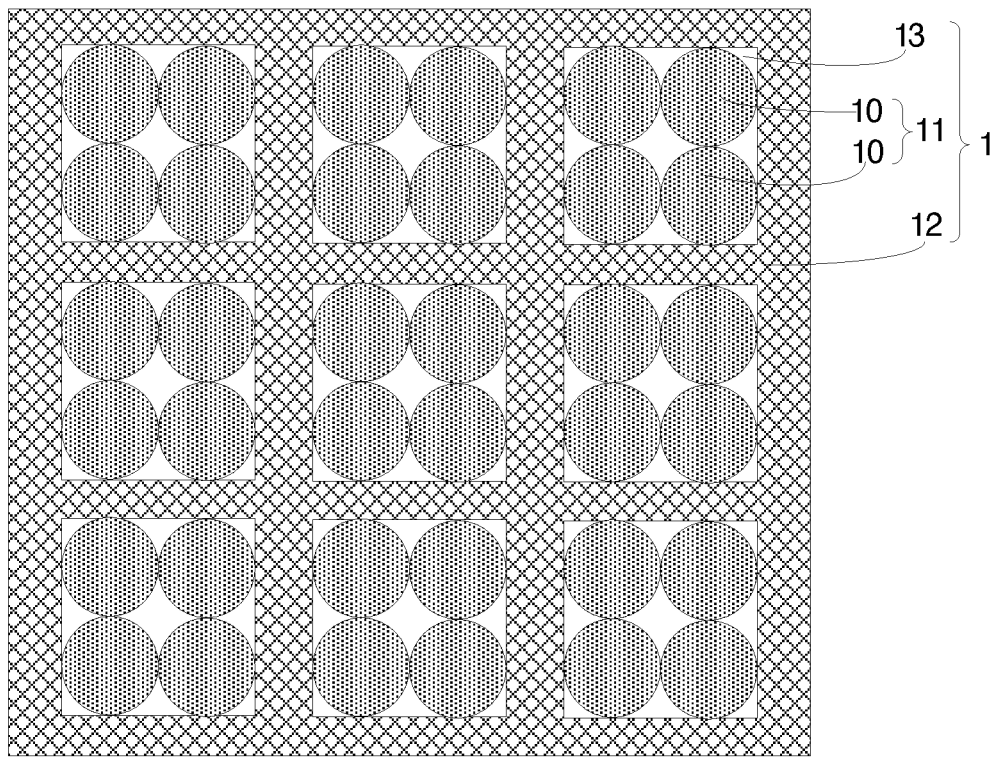

FIG. 9 forming a light concentrating layer, the light concentrating layer includes a plurality of light concentrating structures and a plurality of light isolating structures, the plurality of the light concentrating structures are disposed in the plurality of the sub-pixel opening regions in a one-to-one correspondence, and any adjacent two of the light concentrating structures are provided with one of the light isolating structures disposed therebetween. ⟶ 101

FIG. 10

DISPLAY PANEL

CROSS REFERENCE TO RELATED APPLICATIONS

This application is a National Phase of PCT Patent Application No. PCT/CN2022/131191 having International filing date of Nov. 10, 2022, which claims the benefit of priority of Chinese Application No. 202211049300.X filed on Aug. 30, 2022. The contents of the above applications are all incorporated by reference as if fully set forth herein in their entirety.

BACKGROUND OF INVENTION

Field of Invention

The present application relates to a field of display technology, in particular to a display panel.

Description of Prior Art

A backlight source of a liquid crystal display (LCD) is arranged below a panel body, and light emitted by the backlight source is reflected or absorbed by a film layer in the panel body, resulting in poor light output of a display. That is, light utilization rate of the display is poor, and display contrast is poor, affecting display effect.

SUMMARY OF INVENTION

Embodiments of the present application provides a display panel, which can improve light utilization and display contrast to improve display effect.

The embodiments of the present application provide a display panel, including a plurality of sub-pixel opening regions, the display panel including:
   a light concentrating layer, including a plurality of light concentrating structures and a plurality of light isolating structures;
   wherein the plurality of the light concentrating structures are disposed in the plurality of the sub-pixel opening regions in a one-to-one correspondence, and any adjacent two of the light concentrating structures are provided with one of the light isolating structures disposed therebetween.

Optionally, wherein the plurality of the light isolating structures include one or more of reflective structures and light absorbing structures.

Optionally, wherein the plurality of the light isolating structures include a plurality of reflective structures and a plurality of light absorbing structures;
   any adjacent two of the reflective structures are provided with one of the light absorbing structures disposed therebetween, and any adjacent two of the light absorbing structures are provided with one of the reflective structures disposed therebetween.

Optionally, wherein materials of the reflective structures include white photoresist doped with scattering particles or metal films, wherein the scattering particles include titanium dioxide, and the metal films include an aluminum film; and materials of the light absorbing structures include black resin.

Optionally, wherein heights of the light isolating structures are not greater than heights of the light concentrating structures.

Optionally, wherein the light concentrating layer further includes a planarization layer;
   the planarization layer covering the plurality of the light concentrating structures and the plurality of the light isolating structures, and a refractive index of the planarization layer being less than a refractive index of the light concentrating structures.

Optionally, wherein materials of the light concentrating structures include acrylic resin-based materials, and materials of the planarization layer include siloxane polymers.

Optionally, wherein each of the light concentrating structures includes at least one light concentrating unit;
   wherein light incident surfaces of the at least one light concentrating unit are convex surfaces, and light exiting surfaces of the at least one light concentrating unit are flat surfaces.

Optionally, wherein the light incident surfaces of the at least one light concentrating unit are convex surfaces with circular arcs, and the light exiting surfaces of the at least one light concentrating unit are a circle, an ellipse or a polygon.

Optionally, wherein numbers of the at least one light concentrating unit in different ones of the light concentrating structures are same or different from each other.

Optionally, wherein shapes of the incident surfaces of the at least one light concentrating unit in different ones of the light concentrating structures are same or different from each other, and shapes of the light incident surfaces of different ones of the at least one light concentrating unit in same light concentrating structures are same or different from each other.

Optionally, wherein shapes of the exit surfaces of the at least one light concentrating unit in different ones of the light concentrating structures are same or different from each other, and shapes of the light exiting surfaces of different ones of the at least one light concentrating unit in same light concentrating structures are same or different from each other.

Optionally, wherein each of the light concentrating structures completely covers a corresponding one of the sub-pixel opening regions.

Optionally, wherein the display panel further includes a color filter layer, the color filter layer includes a plurality of color resist units and a plurality of light shielding blocks, the plurality of the color resist units are disposed in the plurality of sub-pixel opening regions in a one-to-one correspondence, the plurality of light shielding blocks are disposed correspondingly to the plurality of the light isolating structures one to one; and
   orthographic projections of the light isolating structures on the color filter layer are located within corresponding ones of the light shielding blocks.

Optionally, wherein the display panel further includes a backlight module,
   the light concentrating layer is located between the backlight module and the color filter layer, or the color filter layer is located between the light concentrating layer and the backlight module.

Optionally, wherein the display panel further includes a color filter substrate;
   wherein the color filter substrate is located on a side of the backlight module, and the color filter substrate includes the light concentrating layer and the color filter layer.

Optionally, wherein the color filter substrate further includes a color filter base,
   the color filter base is located on a side of the color filter substrate facing away from the backlight module.

Optionally, wherein the color filter substrate further includes a photoresist layer,
   the photoresist layer is located on a side of the color filter layer facing away from the color filter base.
Optionally, wherein the display panel further includes an array substrate,
   the array substrate is located between the color filter substrate and the backlight module.
Optionally, wherein the display panel further includes a liquid crystal layer,
   the liquid crystal layer is encapsulated between the color filter substrate and the array substrate.

Advantageous Effects

Beneficial effects of the present application are by setting the light concentrating layer, the plurality of the light concentrating structures are disposed in the plurality of the sub-pixel opening regions in a one-to-one correspondence, so as to collect light in the sub-pixel opening regions and then emit the light, and any adjacent two of the concentrating structures are provided with one of the light isolating structures disposed therebetween to reduce the amount of light leading to the non sub-pixel opening regions, thereby improving the light utilization rate of an display device, reducing the brightness in the dark state, improving the display contrast, and further improving the display effect.

BRIEF DESCRIPTION OF DRAWINGS

The specific implementation of the present application will be described in detail below with reference to the drawings to make the technical solution and other beneficial effects of the present application obvious.

FIG. 9 is a fifth top view of the light concentrating layer in the display panel provided by an embodiment of the present application.

FIG. 10 is a schematic flowchart of a method for manufacturing a display panel provided by an embodiment of the present application.

DETAILED DESCRIPTION OF PREFERRED EMBODIMENTS

Figure 1:
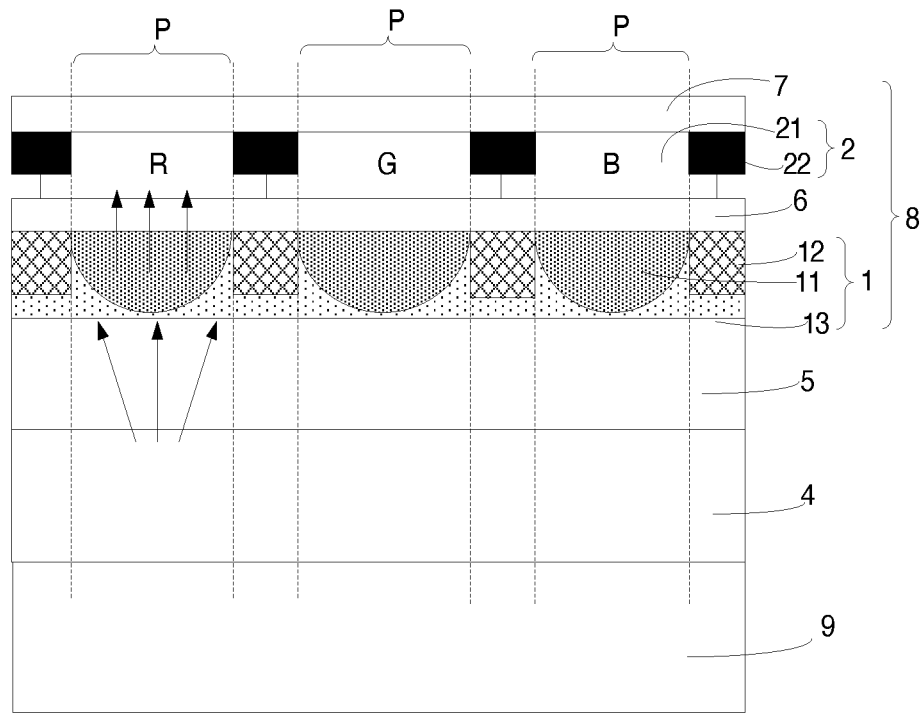
FIG. 1 is a first schematic structural diagram of a display panel provided by an embodiment of the present application.

The specific structural and functional details disclosed herein are merely representative and are for the purpose of describing exemplary embodiments of the present application. However, the present application may be embodied in many alternate forms and should not be construed as being limited to only the embodiments set forth herein.

In the description of the present application, it should be understood that an orientation or a positional relationship indicated by the terms "center", "horizontal", "above", "below", "left", "right", "vertical", "horizontal", "top", "bottom", "inside", "outside", etc. is only for the convenience of describing the present application and simplifying the description, and does not indicate or imply that the device or element referred to must have a specific orientation, be constructed and operate in a specific orientation, and therefore cannot be understood as a limitation on the present application. In addition, the terms "first" and "second" are used for descriptive purposes only and cannot be understood as indicating or implying relative importance or implicitly indicating the number of technical features indicated. Therefore, the features defined as "first" and "second" may explicitly or implicitly include one or more of the features. In the description of the present application, unless otherwise stated, "a plurality" means two or more. Moreover, the term "including" and any synonyms thereof are intended to cover a non-exclusive inclusion.

In the description of the present application, it should be noted that the terms "installation", "connected to each other", and "connected" should be interpreted in a broad sense unless otherwise specified and limited. For example, it can be a fixed connection, a detachable connection, or an integral connection; it can be a mechanical connection or an electrical connection; it can be directly connected or indirectly connected by an intermediate medium, and it can be an internal connection of two elements. For those of ordinary skill in the art, the specific meanings of the above terms in the present application can be understood in specific situations.

The terms used herein are for the purpose of describing particular embodiments only and is not intended to limit the exemplary embodiments. Unless the context clearly indicates otherwise, the singular forms "a" and "an" are intended to include the plural. It should also be understood that the terms "including" and/or "including" as used herein specify the existence of stated features, integers, steps, operations, units and/or components. It does not exclude the presence or addition of one or more other features, integers, steps, operations, units, components, and/or combinations thereof.

The application is further described below with reference to the figures and embodiments.

Referring to FIG. 1 to FIG. 4, which are schematic structural diagrams of a display panel provided by embodiments of the present invention. The display panel may be an LCD.

As shown in FIG. 1 to FIG. 4, the display panel provided by the embodiments of the present invention includes a plurality of sub-pixel opening regions P, the plurality of the sub-pixel opening regions are arranged at intervals and are distributed in an array, and each of the sub-pixel opening regions P is correspondingly provided with a sub-pixel. Sizes of different sub-pixel opening regions P are same or different from each other.

The display panel includes a light concentrating layer 1, the light concentrating layer 1 includes a plurality of light concentrating structures 11 and a plurality of light isolating structures 12. The plurality of the light concentrating structures 11 are arranged at intervals, and numbers of the light concentrating structures 11 may be same as numbers of the sub-pixel opening regions P, and the plurality of the light concentrating structures 11 are disposed in the sub-pixel opening regions P in a one-to-one correspondence. The setting of the light concentrating structures 11 can collect light emitted by a backlight source in the sub-pixel opening regions P and then emit the light, so as to improve light utilization rate of the display panel, and reduce an amount of the light leading to the non sub-pixel opening regions (regions defining between the plurality of the sub-pixel opening regions P), reduce brightness of a dark state, and improve display contrast.

The light isolating structures 12 are disposed in the non sub-pixel opening regions, and any adjacent two of the light concentrating structures 11 are provided with one of the light isolating structures 12 disposed therebetween. The light concentrating structures 11 and the light isolating structures 12 can be arranged at intervals or adjacent to each other (there is no space between light concentrating structures 11 and the light isolating structures 12). The setting of the light isolating structures 12 can further reduce the amount of the light leading to the non sub-pixel opening regions, further reduce the brightness of the dark state, improve the display contrast, and reduce an interference of adjacent lights of different colors, and improve the display effect.

Heights of the light isolating structures 12 are not greater than heights of the light concentrating structures 11, so as to avoid that the setting of the light isolating structures 12 are too high to affect a light concentrating effect of the light concentrating structures 11. The heights of the concentrating structures 11 range from 2 μm to 10 μm.

Figure 2:
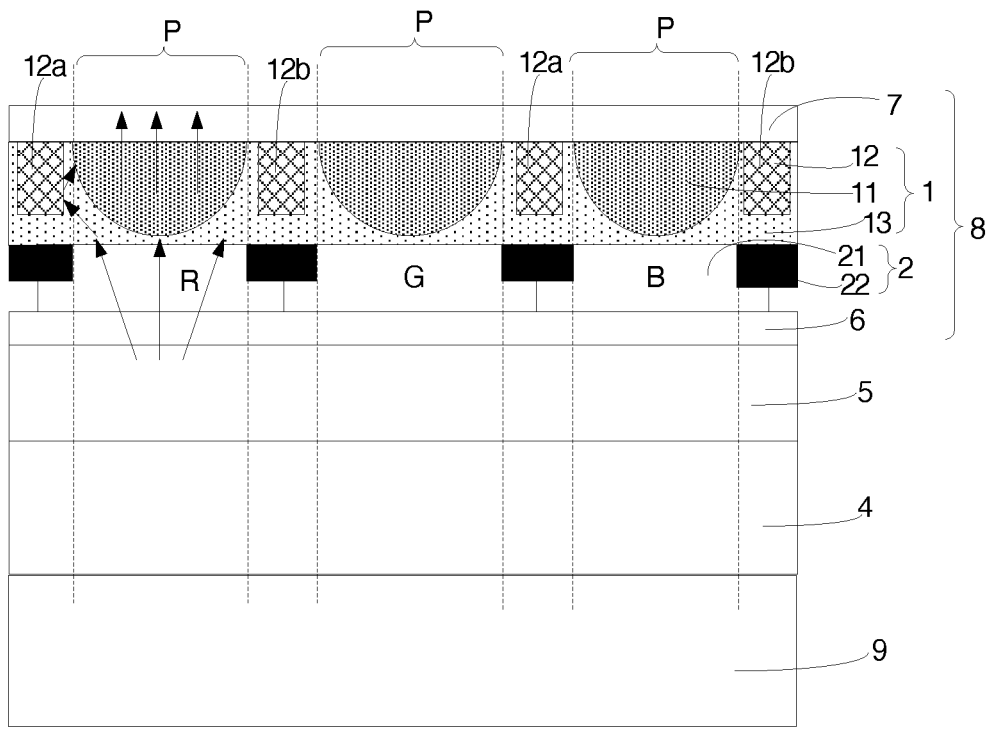
FIG. 2 is a second schematic structural diagram of the display panel provided by an embodiment of the present application.

In one embodiment, as shown in FIG. 1 and FIG. 2, each of the light concentrating structures 11 is a light concentrating unit. Light incident surfaces of the light concentrating structures 11 are convex surfaces, the light incident surfaces refer to surfaces of the light concentrating structures 11 facing the backlight source, and the convex surfaces mean that the light incident surfaces of the concentrating structures 11 are convex toward the backlight source. The convex surfaces can be either the convex surfaces with circular arcs or the convex surfaces with other shapes, and as long as it can achieve the light concentrating effect, and there is no specific limit here. Shapes of the light incident surfaces (shapes of the convex surfaces) in different ones of the light concentrating structures 11 are same or different from each other. Light exiting surfaces of the light concentrating structures 11 are flat surfaces, and the light exiting surfaces refer to surfaces of the light concentrating structures 11 on a side facing away from the backlight source. As shown in FIG. 5 to FIG. 8, the light exiting surfaces of the light concentrating structures 11 can be in regular shapes, such as circle, ellipse, polygon, etc., and the light exiting surfaces of the light concentrating structures 11 can also be in irregular shapes, without specific limitation here. Shapes of the light exiting surfaces in different ones of the light concentrating structures 11 are same or different from each other. For example, each of the light concentrating structures 11 is convex spherical.

Figure 3:
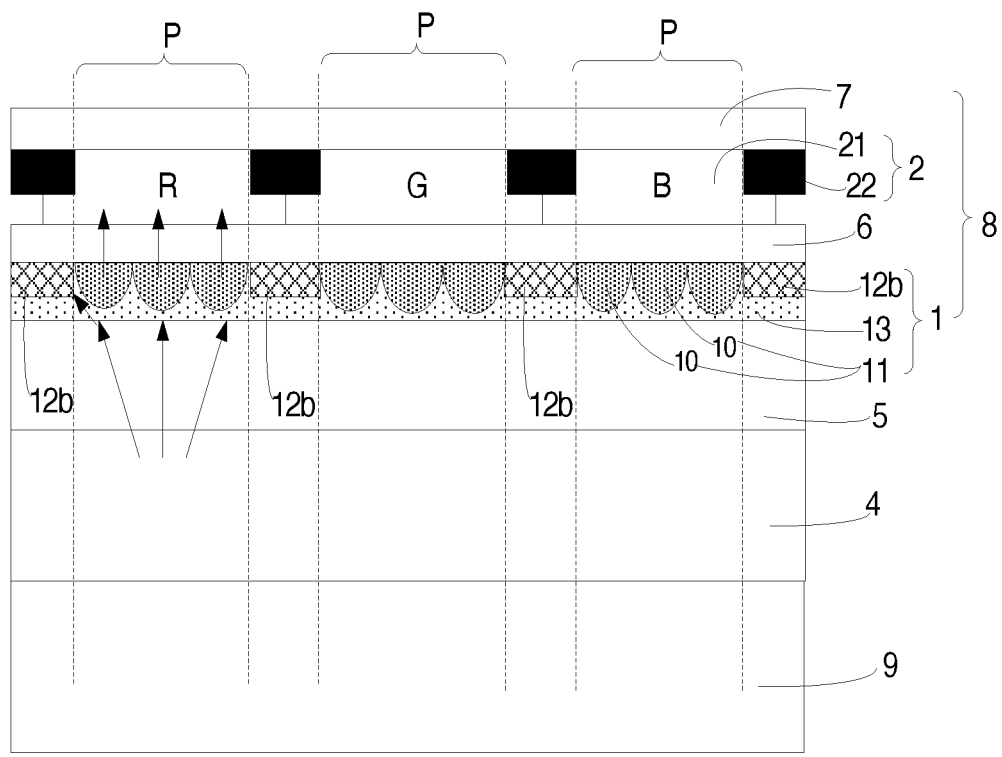
FIG. 3 is a third schematic structural diagram of the display panel provided by an embodiment of the present application.
Figure 4:
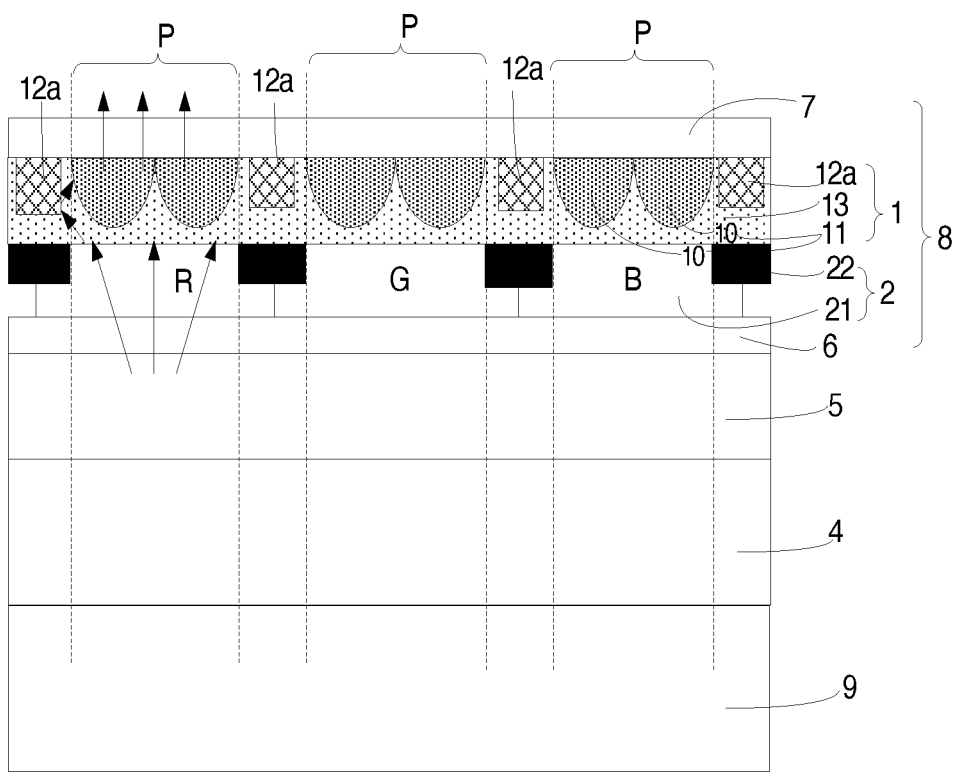
FIG. 4 is a fourth schematic structural diagram of the display panel provided by an embodiment of the present application.
Figure 5:
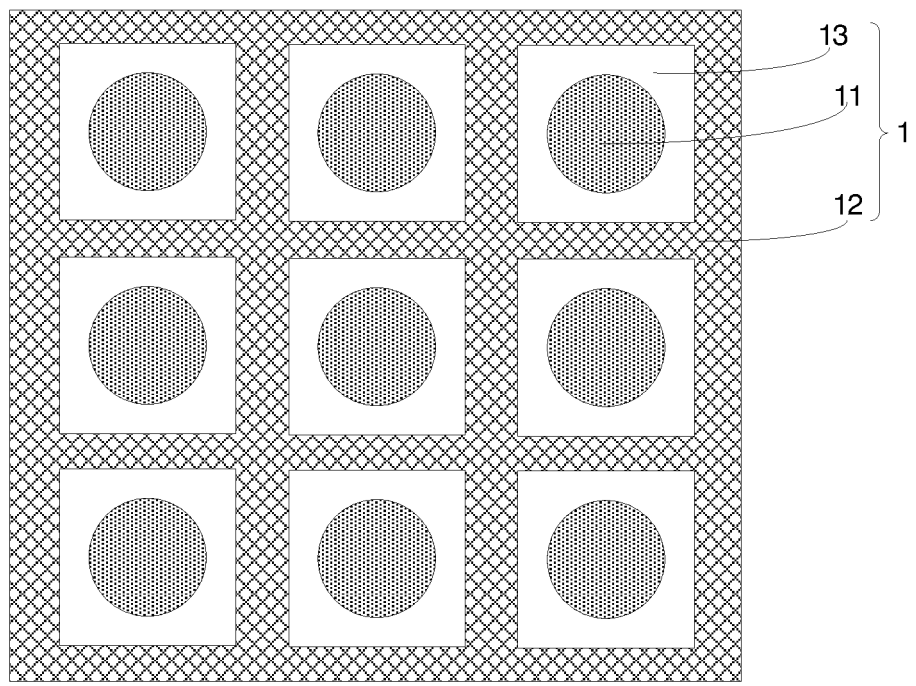
FIG. 5 is a first top view of a light concentrating layer in the display panel provided by an embodiment of the present application.
Figure 6:
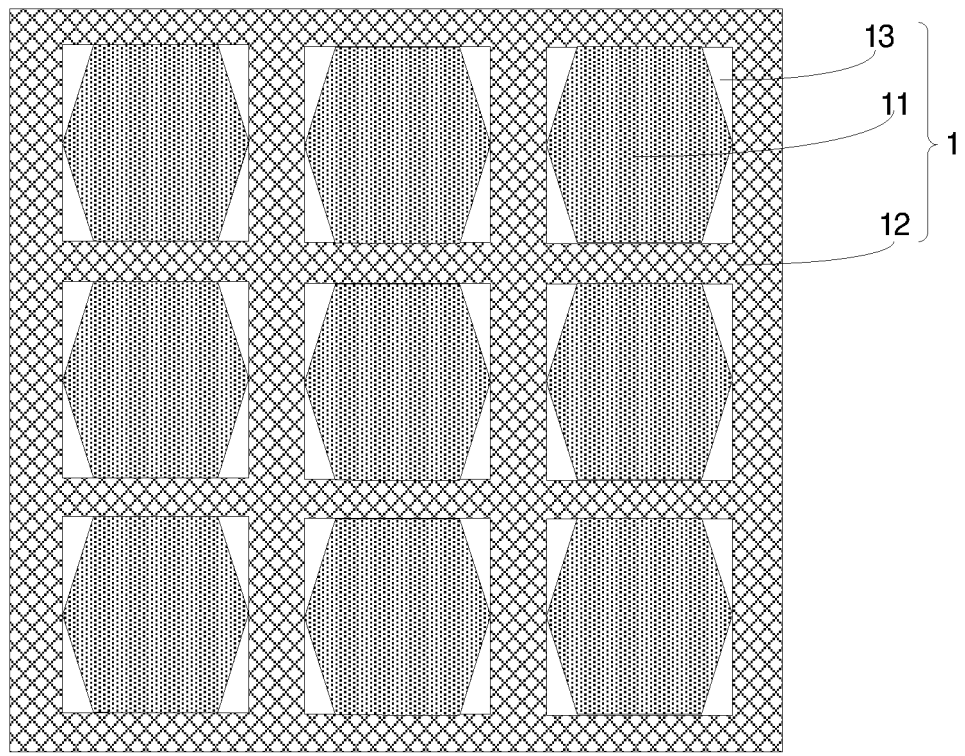
FIG. 6 is a second top view of the light concentrating layer in the display panel provided by an embodiment of the present application.
Figure 7:
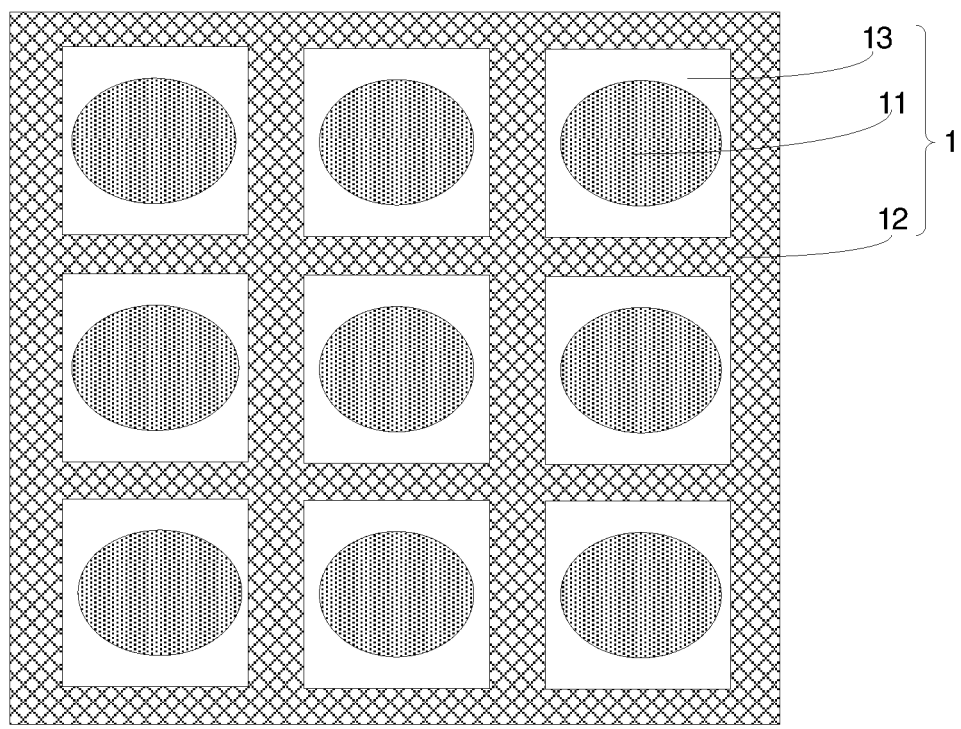
FIG. 7 is a third top view of the light concentrating layer in the display panel provided by an embodiment of the present application.
Figure 8:
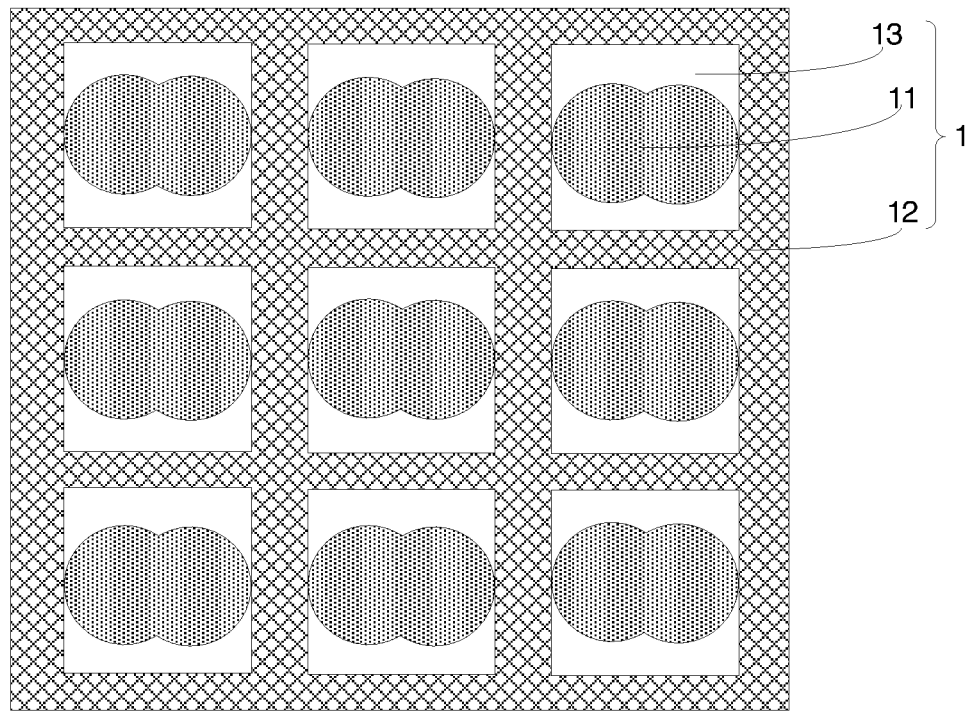
FIG. 8 is a fourth top view of the light concentrating layer in the display panel provided by an embodiment of the present application.

In another embodiment, as shown in FIG. 3 and FIG. 4, each of the light concentrating structures 11 includes a plurality of light concentrating units 10 arranged in parallel, and numbers of the light concentrating units 10 in different ones of the light concentrating structures 11 are same or different from each other. One of the light incident surfaces of each of the light concentrating units 10 is a convex surface, which can be an arc convex surface or a convex surface of other shapes. Shapes of the light incident surfaces of different ones of the light concentrating units 10 in same light concentrating structures 11 are same or different from each other, and shapes of the light incident surfaces of the light concentrating units 10 in different ones of the light concentrating structures 11 are same or different from each other. As shown in FIG. 9, the light exit surface of each of the light concentrating units 10 can be in regular shape, such as circle, ellipse, polygon, etc., and the light exit surface of each of the light concentrating units 10 can also be in irregular shape. Shapes of the light exiting surfaces of different ones of the light concentrating units 10 in same light concentrating structures 11 are same or different from each other, and shapes of the light exiting surfaces of the light concentrating units 10 in different ones of the light concentrating structures 11 are same or different from each other. For example, each of the light concentrating units 10 is convex spherical.

Since sizes of different sub-pixel opening regions P can be the same or different, the light concentrating structures 11 can be set according to the sizes of the different sub-pixel opening regions P, that is, the numbers, the shapes and aperture sizes (i.e. areas of the light exiting surfaces) of the light concentrating units 10 in the light concentrating structures 11 can be set according to the sizes of the different the sub-pixel opening regions P, so as to achieve the best light utilization of the display panel. For example, when the numbers and the shapes of the light concentrating units 10 in the light concentrating structures 11 are fixed, the larger apertures of the light concentrating units 10 are within a certain range, the higher the light utilization of the display panel.

Each of the light concentrating structures 11 can be located in a corresponding one of the sub-pixel opening regions P, or can completely cover the corresponding one of sub-pixel opening regions P. In some embodiments, each of the light concentrating structures 11 exactly covers the corresponding one of the sub-pixel opening regions P, so as to collect the light illuminating the non sub-pixel opening regions to the sub-pixel opening regions P as much as possible, and improve the light utilization of the display panel.

Materials of the light concentrating structures 11 are high refractive index materials and high transmittance materials, refractive index of the light concentrating structures 11 are greater than or equal to 1.6, and transmittances are greater than 90%. For example, the materials of the concentrating structures 11 are acrylic resin materials and the like.

As shown in FIG. 2 to FIG. 4, the plurality of the light isolating structures 12 include one or more of reflective structures 12a and light absorbing structures 12b. That is, as shown in FIG. 4, the plurality of the light isolating structures 12 can all be the reflective structures 12a. As shown in FIG. 3, the plurality of the light isolating structures 12 can all be the light absorbing structures 12b. As shown in FIG. 2, the plurality of the light isolating structures 12 can be partially the reflection structures 12a and partially the light absorbing structures 12b.

The reflective structures 12a are used to reflect the light illuminating the non sub-pixel opening regions to the sub-pixel opening regions P, further increase the light amount of the sub-pixel opening regions P, and improve the light utilization of the display panel. The light absorbing structures 12b are used to absorb light illuminating the non sub-pixel opening regions, further reducing the amount of light in the non sub-pixel opening regions, thereby reducing the brightness of the dark state, and increasing the display contrast. In addition, the light absorbing structures 12b can also absorb redundant adjacent interference color light.

As shown in FIG. 2, when the plurality of the light isolating structures 12 include the plurality of the reflective structures 12a and the plurality of the light absorbing structures 12b, the plurality of the reflective structures 12a and the plurality of the light absorbing structures 12b can be arranged alternately, that is, any adjacent two of the reflective structures 12a are provided with one of the light absorbing structures 12b disposed therebetween, and any adjacent two of the light absorbing structures 12b are provided with one of the reflective structures 12a disposed therebetween. When the plurality of the light isolating structures 12 are all reflective structures 12a, a reflectivity may be too strong and the display effect may be affected. By alternately setting the reflective structures 12a and the light absorbing structures 12b, the light utilization can be increased, the reflectivity can be reduced, and the display effect can be effectively improved.

The reflective structures 12a can be white photoresists doped with scattering particles, the scattering particles can include titanium dioxide, etc., and the reflective structures 12a can also be metal films, such as aluminum film. Materials of the light absorbing structures 12b may be black resins or the like.

As shown in FIG. 1 to FIG. 4, the light concentrating layer 1 can also include a planarization layer 13, the planarization layer 13 can be filled between the plurality of the light concentrating structures 11 and the plurality of the light isolating structures 12, and can be cover the plurality of the light concentrating structures 11 and the plurality of the light isolating structures 12, so as to ensure that the light incident surfaces (surfaces of the planarization layer 13 on a side close to the backlight source) of the planarization layer 13 is a plane.

A refractive index of the planarization layer 13 is smaller than a refractive index of the light concentrating structures 11. The light from the backlight source first passes through the planarization layer 13 with low refractive index, and then passes through the light concentrating structures 11 with high refractive index, effectively improving the refraction effect, and thus improving the light concentrating effect. Materials of the planarization layer 13 are low refractive index materials, such as siloxane polymers or the like.

As shown in FIG. 1 to FIG. 4, the display panel includes a color film substrate 8, the color film substrate 8 includes the above light concentrating layer 1. The color film substrate 8 can also include a color film layer 2, the color film layer 2 can include a plurality of color resist units 21, and the plurality of the color resist units 21 can include a plurality of color resist units configured to display a plurality of colors, such as red color resist units R, blue color resist units B, green color resist units G. The plurality of the color resist units 21 are arranged at intervals, and a number of the plurality of the color resist units 21 are a same as a number of the sub-pixel opening regions P, the plurality of the color resist units 21 are disposed correspondingly to the sub-pixel opening regions P one to one, so the color resist units 21 and the light concentrating structures 11 at a same sub-pixel opening region P are arranged correspondingly, that is, the plurality of the color resist units 21 and the plurality of the light concentrating structures 11 are arranged in a one-to-one correspondence. Orthographic projections of the light concentrating structures 11 on the color filter layer 2 may be located within corresponding ones of the color resist units 21, or may completely cover corresponding color resist units 21.

The color film layer 2 can also include a plurality of light shielding blocks 22, any adjacent two of the color resist units 21 are provided with one of the light shielding blocks 22 disposed therebetween, and the plurality of the light shielding blocks 22 are disposed correspondingly to the plurality of the light isolating structures 12 one to one. Orthographic projections of the light isolating structures 12 on the color filter layer 2 may be located within corresponding ones of the light shielding blocks 22, or may just cover corresponding ones of the light shielding blocks 22. In other words, widths of the light isolating structures 12 are not greater than widths of corresponding ones of the light shielding blocks 22, so as to avoid an influence of an arrangement of the light isolating structures 12 on the display effect of the display panel. Side surfaces of the light concentrating structures 11 can be flush with insides of the light shielding blocks 22, so as to gather the light illuminating the non sub-pixel opening regions to the sub-pixel opening regions P as much as possible, and improve the light utilization of the display panel.

The color film substrate 8 may also include a color film base 7. The light concentrating layer 1 is located between the color film base 7 and the color film layer 2, or the color film layer 2 is located between the light concentrating layer 1 and the color film base 7. The color film substrate 8 can also include a photoresist layer 6, the photoresist layer 6 is located on a side of the color film layer 2 facing away from the color film base 7. When the color film layer 2 is located between the concentrating layer 1 and the color film base 7, the photoresist layer 6 is located between the color film layer 2 and the concentrating layer 1.

The display panel can also include an array substrate 4, the array substrate 4 and the color film substrate 8 are arranged relatively. The array substrate 4 may include an array base (not shown in the figure) and an array layer (not shown in the figure) located on the array base. The array layer can include a plurality of thin film transistors (not shown in the figure), which are disposed correspondingly to the plurality of sub-pixel opening regions P one to one. The display panel can also include a liquid crystal layer 5, the liquid crystal layer 5 is encapsulated between the array substrate 4 and the color film substrate 8.

The display panel can also include a backlight module 9, and the array substrate 4 is located on the backlight module 9. The backlight module 9 may include the backlight source (not shown in the figure) for providing a light source to the display panel. The backlight module 9 may also include a reflector (not shown in the figure), a light guide plate (not shown in the figure), a diffuser (not shown in the figure), a lower light enhancement sheet (not shown in the figure) and an upper light enhancement sheet (not shown in the figure) arranged in sequence. The reflector can be arranged on a back plate (not shown in the figure), the light guide plate is arranged on the reflector, the diffuser is arranged on the light guide plate, the lower light enhancement sheet is arranged on the diffuser, the upper light enhancement sheet is arranged on the lower light enhancement sheet, and the backlight source is arranged on a side of the reflector facing away from the light guide plate. The diffuser is used to diffuse the light emitted by the backlight source to provide a uniform surface light source, and the lower light enhancement sheet and the upper light enhancement sheet are used to enhance a brightness of the light source.

In one embodiment, as shown in FIG. 1 and FIG. 3, the concentrating layer 1 is located between the backlight module 9 and the color film layer 2. Specifically, the concentrating layer 1 is located between the liquid crystal layer 5 and the photoresist layer 6, and the color film layer 2 is located between the photoresist layer 6 and the color film base 7. The light emitted by the backlight source is gathered to the sub-pixel opening regions P through the concentrating layer 1 and then emitted through the color film layer 2, effectively improving the light utilization of the display panel.

In another embodiment, as shown in FIG. 2 and FIG. 4, the color film layer 2 is located between the backlight module 9 and the light concentrating layer 1. Specifically, the color film layer 2 is located between the photoresist layer 6 and the color film base 7, and the light concentrating layer 1 is located between the color film layer 2 and the color film base 7. The light emitted by the backlight source passes through the color film layer 2 and then converges to the sub-pixel opening regions P through the light concentrating layer 1, effectively improving the light utilization of the display panel.

In the embodiment of the application, by setting the light concentrating layer, the plurality of the light concentrating structures are disposed in the plurality of the sub-pixel opening regions in a one-to-one correspondence, so as to collect light in the sub-pixel opening regions and then emit the light, and any adjacent two of the concentrating structures are provided with one of the light isolating structures disposed therebetween to reduce the amount of light leading to the non sub-pixel opening regions, thereby improving the light utilization rate of an display device, reducing the brightness in the dark state, improving the display contrast, and further improving the display effect.

Correspondingly, an embodiment of the present invention also provides a method for manufacturing a display panel, which can manufacture the display panel in the above-mentioned embodiments.

As shown in FIG. 10, the method for manufacturing the display panel provided by the embodiment of the present invention, the display panel includes a plurality of sub-pixel opening regions, and the method includes step 101, which is specifically as follows:

Step 101: forming a light concentrating layer, the light concentrating layer includes a plurality of light concentrating structures and a plurality of light isolating structures, the plurality of the light concentrating structures are disposed in the plurality of the sub-pixel opening regions in a one-to-one correspondence, and any adjacent two of the light concentrating structures are provided with one of the light isolating structures disposed therebetween.

The light isolating structures are made by a yellow light process, and the concentrating structures are made by the yellow light process or a nano imprinting process. For example, a light isolating material layer is first coated, and then the light isolating material layer etched into the plurality of the light isolating structures through steps such as exposure, development and baking. A plurality of openings are separated by the plurality of the light isolating structures, a high refractive index material layer is coated on the light isolating structures, and the high refractive index material layer is filled with the plurality of openings. the high refractive index material layer is etched into the plurality of light concentrating structures through steps such as exposure, development and baking, and the plurality of the light concentrating structures are located in the plurality of the openings in a one-to-one correspondence. A fabrication process of the light isolating structures and a manufacturing process of the light concentrating structures are simple, and a trial equipment of a current production line can be used for fabrication.

The light concentrating layer also includes a planarization layer, after forming the plurality of the light concentrating structures and the plurality of the light isolating structures, the plurality of the light concentrating structures and the plurality of the light isolating structures are covered with low refractive index materials to form the planarization layer.

Furthermore, the method also includes forming a color film base, a color film layer and a photoresist layer, so that the color film base, the color film layer, the photoresist layer and the light concentrating layer constitute a color film substrate.

In one embodiment, as shown in FIG. 1 and FIG. 3, providing the color film base 7 firstly, and then forming the color film layer 2 on the color film base 7. The color film layer 2 can include a plurality of color resist units 21 and a plurality of light shielding blocks 22. The plurality of the color resist units 21 are formed on the plurality of the sub-pixel opening regions P in a one-to-one correspondence, any adjacent two of the color resist units 21 are provided with one of the light shielding blocks 22 disposed therebetween, and the light shielding blocks 22 are located in the non sub-pixel opening regions.

Then, forming the photoresist layer 6 on the color film layer 2, and forming the light concentrating layer 1 on the photoresist layer 6, thus constituting the color film substrate 8. The light concentrating layer 1 includes the plurality of the light concentrating structures 11 and the plurality of the light isolating structures 12 which are formed on the photoresist layer 6. The plurality of the light concentrating structures 11 are disposed in the sub-pixel opening regions P in a one-to-one correspondence, so that the plurality of the light concentrating structures 11 are disposed correspondingly to the plurality of the color resist units 21 one to one, the plurality of the light isolating structures 12 are disposed correspondingly to the plurality of the light shielding blocks 22 one to one, any adjacent two of the light concentrating structures 11 are provided with one of the light isolating structures 12 disposed therebetween. The light concentrating layer 1 also includes the planarization layer 13, the planarization layer 13 covers the plurality of the light concentrating structures 11 and the plurality of the light isolating structures 12, and a surface of the planarization layer 13 on a side facing away from the photoresist layer 6 is a plane.

Then, the color film substrate 8 and the array substrate 4 are arranged in a box, so that the color film base 7 is disposed away from the array substrate 4. Then, a liquid crystal layer 5 is filled between the color film substrate 8 and the array substrate 4 to form a display panel.

In another embodiment, as shown in FIG. 2 and FIG. 4, providing the color film base 7 firstly, and forming the light concentrating layer 1 on the color film base 7. The light concentrating layer 1 includes the plurality of the light concentrating structures 11 and the plurality of the light isolating structures 12 which are formed on the color film base 7. The plurality of light-concentrating structures 11 are disposed in the sub-pixel opening regions P in a one-to-one correspondence, and any adjacent two of the light concentrating structures 11 are provided with one of the light isolating structures 12 disposed therebetween, and the light isolating structures 12 are located in the non-sub-pixel opening regions. The light concentrating layer 1 also includes the planarization layer 13, the planarization layer 13 covers the plurality of the light concentrating structures 11 and the plurality of the light isolating structures 12, and the surface of the planarization layer 13 on the side facing away from the photoresist layer 6 is the plane.

Then, forming the color film layer 2 on the light concentrating layer 1. The color film layer 2 can include the plurality of color resist units 21 and the plurality of the light shielding blocks 22, the plurality of the color resist units 21 are formed in the plurality of the sub-pixel opening regions P in a one-to-one correspondence, so that the plurality of the color resist units 21 are disposed in the plurality of the light concentrating structures 11 in a one-to-one correspondence, the plurality of the light shielding blocks 22 are disposed in the plurality of the light isolating structures 12 a one-to-one correspondence, and any adjacent two of color resist units 21 are provided with one of the light shielding blocks 22 disposed therebetween, and the light shielding blocks 22 are located in the non sub-pixel opening regions. Then, forming the photoresist layer on the color film layer 2 to constitute the color film substrate 8.

Then, the color film substrate 8 and the array substrate 4 are arranged in a box, so that the color film base 7 is arranged away from the array substrate 4. Then, the liquid crystal layer 5 is filled between the color film substrate 8 and the array substrate 4 to form a display panel.

To sum up, by setting the light concentrating layer, the plurality of the light concentrating structures are disposed in the plurality of the sub-pixel opening regions in a one-to-one correspondence, so as to collect light in the sub-pixel opening regions and then emit the light, and any adjacent two of the concentrating structures are provided with one of the light isolating structures disposed therebetween to reduce the amount of light leading to the non sub-pixel opening regions, thereby improving the light utilization rate of an display device, reducing the brightness in the dark state, improving the display contrast, and further improving the display effect.

As stated above, although the present application has already been described in the embodiments, the present application is not limited to the disclosed embodiments. It is obvious to those skilled in the art that the above exemplary embodiments may be modified without departing from the scope and spirit of the present application. Therefore, the protection scope of the present application is subject to the scope defined by the claims.

What is claimed is:

1. A display panel comprising a plurality of sub-pixel opening regions, the display panel comprising:
    a light concentrating layer, comprising a plurality of light concentrating structures and a plurality of light isolating structures;
    wherein the plurality of the light concentrating structures are disposed in the plurality of the sub-pixel opening regions in a one-to-one correspondence, and any adjacent two of the light concentrating structures are provided with one of the light isolating structures disposed therebetween; and
    wherein the display panel further comprises a backlight module and a color filter substrate, the color filter substrate is located on a side of the backlight module, and the color filter substrate comprises the light concentrating layer and a color filter layer.

2. The display panel as claimed in claim 1, wherein the plurality of the light isolating structures comprise one or more of reflective structures and light absorbing structures.

3. The display panel as claimed in claim 2, wherein materials of the reflective structures comprise white photoresist doped with scattering particles or metal films, wherein the scattering particles comprise titanium dioxide, and the metal films comprise an aluminum film; and
    materials of the light absorbing structures comprise black resin.

4. The display panel as claimed in claim 1, wherein the plurality of the light isolating structures comprise a plurality of reflective structures and a plurality of light absorbing structures;
    any adjacent two of the reflective structures are provided with one of the light absorbing structures disposed therebetween, and any adjacent two of the light absorbing structures are provided with one of the reflective structures disposed therebetween.

5. The display panel as claimed in claim 1, wherein heights of the light isolating structures are not greater than heights of the light concentrating structures.

6. The display panel as claimed in claim 1, wherein the light concentrating layer further comprises a planarization layer;
    the planarization layer covers the plurality of the light concentrating structures and the plurality of the light isolating structures, and a refractive index of the planarization layer being less than a refractive index of the light concentrating structures.

7. The display panel as claimed in claim 6, wherein materials of the light concentrating structures comprise acrylic resin-based materials, and materials of the planarization layer comprise siloxane polymers.

8. The display panel as claimed in claim 1, wherein each of the light concentrating structures comprises at least one light concentrating unit;
    wherein light incident surfaces of the at least one light concentrating unit are convex surfaces, and light exiting surfaces of the at least one light concentrating unit are flat surfaces.

9. The display panel as claimed in claim 8, wherein the light incident surfaces of the at least one light concentrating unit are convex surfaces with circular arcs, and the light exiting surfaces of the at least one light concentrating unit are a circle, an ellipse or a polygon.

10. The display panel as claimed in claim 8, wherein numbers of the at least one light concentrating unit in different ones of the light concentrating structures are same or different from each other.

11. The display panel as claimed in claim 8, wherein shapes of the incident surfaces of the at least one light concentrating unit in different ones of the light concentrating structures are same or different from each other, and shapes of the light incident surfaces of different ones of the at least one light concentrating unit in same light concentrating structures are same or different from each other.

12. The display panel as claimed in claim 8, wherein shapes of the exit surfaces of the at least one light concentrating unit in different ones of the light concentrating structures are same or different from each other, and shapes of the light exiting surfaces of different ones of the at least one light concentrating unit in same light concentrating structures are same or different from each other.

13. The display panel as claimed in claim 1, wherein each of the light concentrating structures completely covers a corresponding one of the sub-pixel opening regions.

14. The display panel as claimed in claim 1, wherein the color filter layer comprises a plurality of color resist units and a plurality of light shielding blocks, the plurality of the color resist units are disposed in the plurality of sub-pixel opening regions in a one-to-one correspondence, the plurality of light shielding blocks are disposed correspondingly to the plurality of the light isolating structures one to one; and
    orthographic projections of the light isolating structures on the color filter layer are located within corresponding ones of the light shielding blocks.

15. The display panel as claimed in claim 14, wherein the color filter substrate further comprises a photoresist layer,
the photoresist layer is located on a side of the color filter layer facing away from the color filter base.

16. The display panel as claimed in claim 14, wherein the light concentrating layer is located between the backlight module and the color filter layer, or the color filter layer is located between the light concentrating layer and the backlight module.

17. The display panel as claimed in claim 16, wherein the color filter substrate further comprises a color filter base,
the color filter base is located on a side of the color filter substrate facing away from the backlight module.

18. The display panel as claimed in claim 16, wherein the display panel further comprises an array substrate,
the array substrate is located between the color filter substrate and the backlight module.

19. A display panel comprising a plurality of sub-pixel opening regions, the display panel comprising a light concentrating layer, wherein the light concentrating layer comprises a plurality of light concentrating structures and a plurality of light isolating structures;
wherein the plurality of the light concentrating structures are disposed in the plurality of the sub-pixel opening regions in a one-to-one correspondence, and any adjacent two of the light concentrating structures are provided with one of the light isolating structures disposed therebetween; and
wherein the plurality of the light isolating structures comprise a plurality of reflective structures and a plurality of light absorbing structures; and any adjacent two of the reflective structures are provided with one of the light absorbing structures disposed therebetween, and any adjacent two of the light absorbing structures are provided with one of the reflective structures disposed therebetween.

20. A display panel, comprising a plurality of sub-pixel opening regions, the display panel comprising:
a color film base;
a light concentrating layer comprising a plurality of light concentrating structures, a plurality of light isolating structures, and a planarization layer; wherein the plurality of the light concentrating structures are disposed in the plurality of the sub-pixel opening regions in a one-to-one correspondence, and any adjacent two of the light concentrating structures are provided with one of the light isolating structures disposed therebetween; and the planarization layer covers the plurality of the light concentrating structures and the plurality of the light isolating structures, and a refractive index of the planarization layer being less than a refractive index of the light concentrating structures; and
a color filter layer, wherein the color filter layer is disposed between the color film base and the light concentrating layer, or the light concentrating layer is disposed between the color film base and the color filter layer; wherein the color filter layer comprises a plurality of color resist units and a plurality of light shielding blocks, the plurality of the color resist units are disposed in the plurality of sub-pixel opening regions in a one-to-one correspondence, the plurality of light shielding blocks are disposed correspondingly to the plurality of the light isolating structures one to one, and orthographic projections of the light isolating structures on the color filter layer are located within corresponding ones of the light shielding blocks;
wherein heights of the light isolating structures are not greater than heights of the light concentrating structures, a surface of the light isolating structures close to a light exiting direction is flush with a surface of the light concentrating structures close to the light exiting direction, and a width of one of the light isolating structures is not greater than a width of corresponding one of the light shielding blocks; and one of the light isolating structures and adjacent light concentrating structures thereof are spaced apart, and a side surface of one of the light concentrating structures is flush with an inner side surface of corresponding one of the light shielding blocks;
the plurality of the light isolating structures comprise a plurality of reflective structures and a plurality of light absorbing structures, any adjacent two of the reflective structures are provided with one of the light absorbing structures disposed therebetween, and any adjacent two of the light absorbing structures are provided with one of the reflective structures disposed therebetween; and
one of the light concentrating structures comprises at least one light concentrating unit arranged in parallel, a light incident surface of the at least one light concentrating unit is a convex surface, and a light exiting surface of the at least one light concentrating unit is a flat surface.

* * * * *